US 8,902,922 B2

(12) United States Patent
Soni et al.

(10) Patent No.: US 8,902,922 B2
(45) Date of Patent: Dec. 2, 2014

(54) UNIFIED PROGRAMMABLE INTERFACE FOR REAL-TIME ETHERNET

(71) Applicant: Texas Instruments Incorporated, Dallas, TX (US)

(72) Inventors: Maneesh Soni, Bangalore (IN); William C. Wallace, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 121 days.

(21) Appl. No.: 13/734,699

(22) Filed: Jan. 4, 2013

(65) Prior Publication Data

US 2013/0177026 A1   Jul. 11, 2013

Related U.S. Application Data

(60) Provisional application No. 61/583,255, filed on Jan. 5, 2012.

(51) Int. Cl.
| | |
|---|---|
| *H04L 12/66* | (2006.01) |
| *H04L 29/10* | (2006.01) |
| *G06F 13/00* | (2006.01) |
| *G06F 13/38* | (2006.01) |
| *G06F 11/10* | (2006.01) |
| *H04L 12/40* | (2006.01) |

(52) U.S. Cl.
CPC .............. *H04L 29/10* (2013.01); *G06F 13/00* (2013.01); *G06F 13/385* (2013.01); *G06F 11/1004* (2013.01); *H04L 12/40032* (2013.01)
USPC ......................... 370/463; 370/419; 710/305

(58) Field of Classification Search
USPC .......... 257/348; 370/228, 365, 389, 392, 401, 370/463, 465, 473, 419–421; 359/894; 375/219, 224, 361; 379/55.1; 708/250; 709/223, 250; 710/305, 306; 711/152
See application file for complete search history.

(56) References Cited

U.S. PATENT DOCUMENTS

| | | | | |
|---|---|---|---|---|
| 6,839,345 | B2 * | 1/2005 | Lu et al. ......................... | 370/365 |
| 7,761,643 | B1 * | 7/2010 | Yin et al. ....................... | 710/306 |
| 2009/0175283 | A1 * | 7/2009 | Jan et al. ....................... | 370/401 |

* cited by examiner

*Primary Examiner* — Bob Phunkulh
*Assistant Examiner* — Wali Butt
(74) *Attorney, Agent, or Firm* — Robert D. Marshall, Jr.; Frederick J. Telecky, Jr.

(57) ABSTRACT

This invention is a low level programmable logic that can communicate with Media Independent Interface (MII) (Ethernet) interface in a highly configurable manner under the control of a CPU. This invention is highly configurable for various existing and new Ethernet based communication standards, programmable in an easy to learn assembly language, low power and high performance.

7 Claims, 7 Drawing Sheets

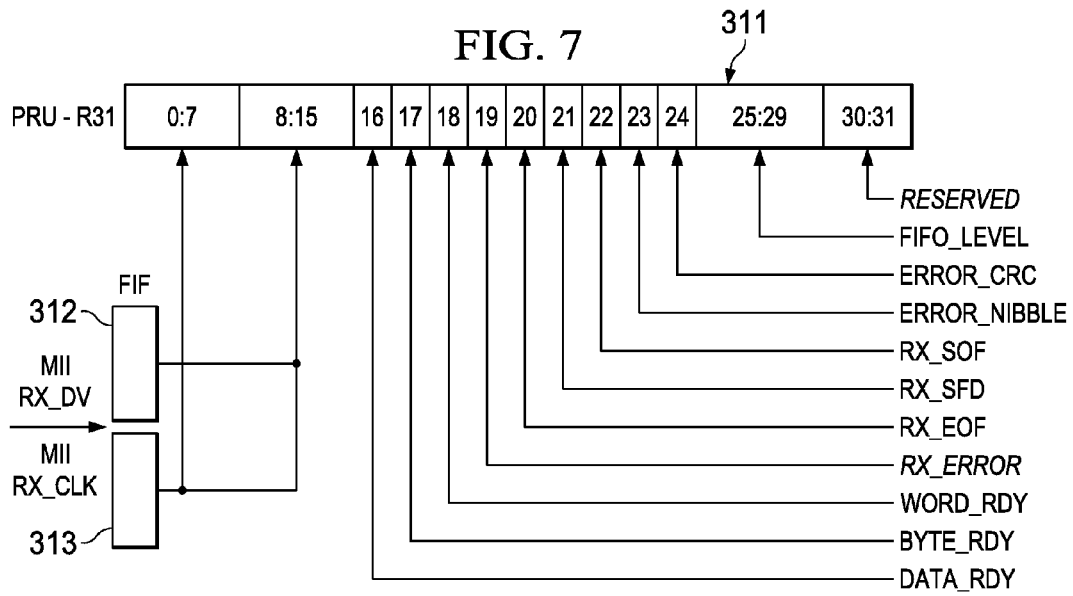
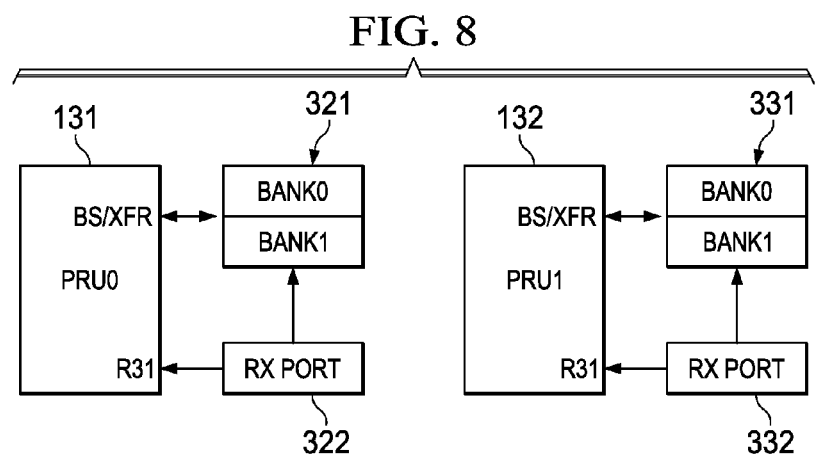
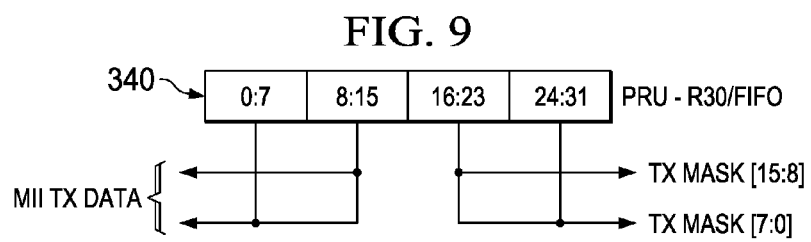

US 8,902,922 B2

UNIFIED PROGRAMMABLE INTERFACE FOR REAL-TIME ETHERNET

CLAIM OF PRIORITY

This application claims priority under 35 U.S.C. 119(e)(1) to U.S. Provisional Application No. 61/583,255 filed Jan. 5, 2012.

TECHNICAL FIELD OF THE INVENTION

The technical field of this invention is computer network interfaces.

BACKGROUND OF THE INVENTION

This invention permits common hardware to support multiple, often divergent, Ethernet based industrial communication standards as well as custom proprietary schemes.

SUMMARY OF THE INVENTION

This invention is a low level programmable logic that can communicate with Media Independent Interface (MII) (Ethernet) interface in a highly configurable manner under the control of a CPU.

Other solutions use Field Programmable Gate Arrays (FPGAs) to create different logic to handle different needs. Few other solutions create separate Application Specific Integrated Circuit (ASIC) for each communication standard. At least one other seems to have a programmable solution but is probably more granular than ours.

This invention is highly configurable for various existing and new Ethernet based communication standards, programmable in an easy to learn assembly language and high performance. The invention is specific to real-time MII not programmable in assembly language. This invention uses this interface via the Programmable Real-time Unit (PRU) processor.

BRIEF DESCRIPTION OF THE DRAWINGS

These and other aspects of this invention are illustrated in the drawings, in which:

FIG. 7 illustrates the interface between the Receive (RX) Media Independent Interface (MII) and the Programmable Real-time Unit (PRU) via register R31 of this invention;

FIG. 8 illustrates the connection of two Programmable Real-time Units (PRUs) to memory and a Receive (RX) port according to this invention;

FIG. 9 illustrates the interface between the he Programmable Real-time Unit (PRU) and the Transmit (TX) Media Independent Interface (MII) of this invention;

DETAILED DESCRIPTION OF PREFERRED EMBODIMENTS

Figure 1:
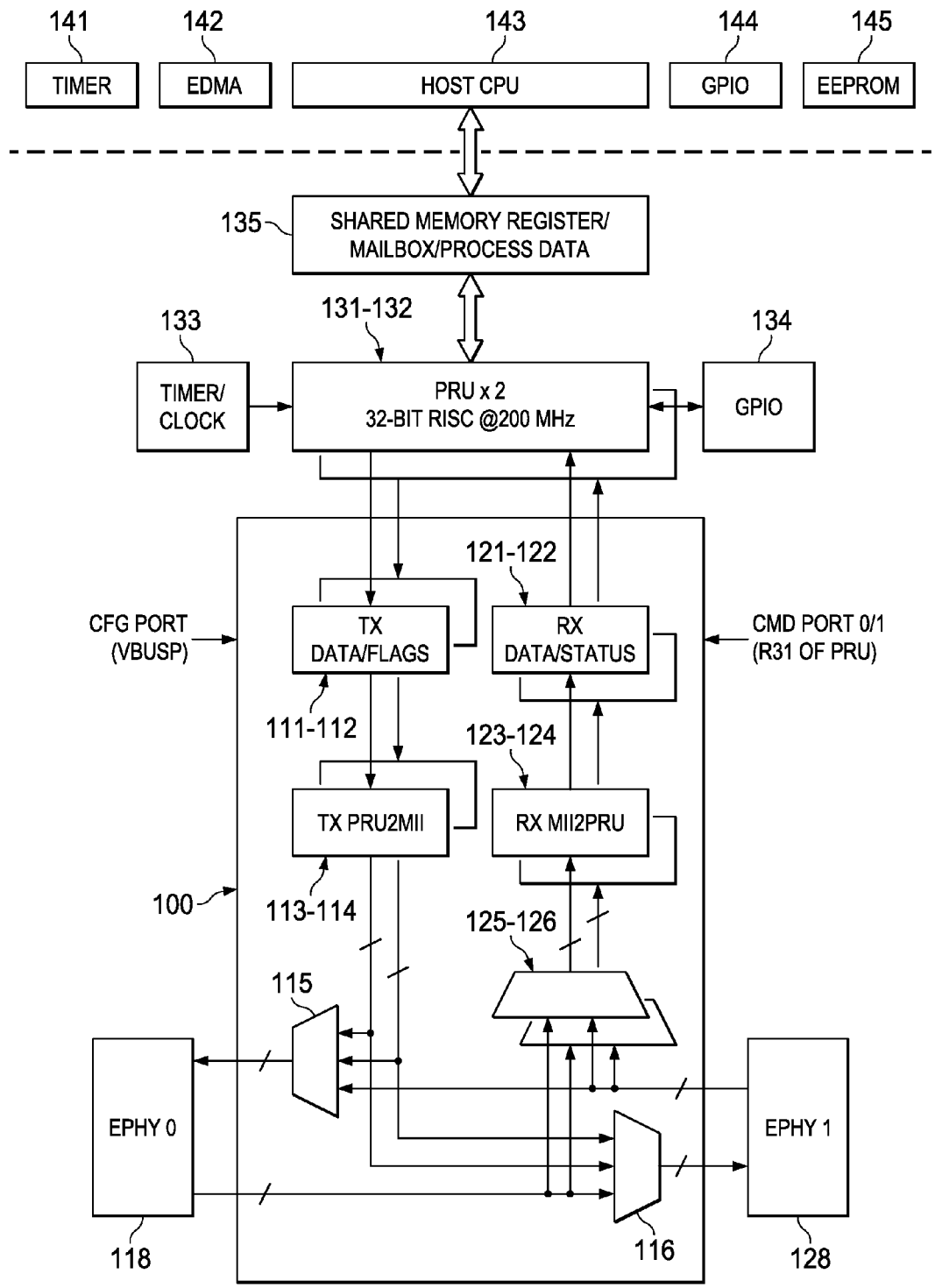
FIG. 1 is a block diagram of the Industrial Communication Sub-System (ICSS) real-time Media Independent Interface (MII) of this invention.

FIG. 1 illustrates an example Real Time Media Independent Interface (MII_RT) in an Industrial Communication Subsystem (ICSS). This invention preferably supports the following features of the Industrial Ethernet standard in ICSS: two MII ports; 32 byte Receive (RX) and 64 byte Transmit (TX) first-in-first-out (FIFO) buffer per port; rate decoupling on TX FIFO; synchronized output and inputs on MII Interface; 32-bit Cyclic Redundancy Check (CRC32) generation on TX path; 32-bit Cyclic Redundancy Check (CRC32) checker on RX path; configurable pre-amble removal; sync frame delimiter detection; MII port multiplexer per direction to support line/ring structure; configurable pre-amble insertion on TX FIFO; link detection through Receive Error Detection/Correction (RX_ERR); and configurable TX FIFO trigger on 10 bits with 40 nS ticks. The size of the RX and TS buffers may vary from the 32 bytes and 64 bytes of this exemplary embodiment.

The Real Time Media Independent Interface illustrated in FIG. 1 connects to a host system including timer 141, extended direct memory access (EDMA) unit 142, host central processing unit (CPU) 143, general purpose Input/Output (GPIO) unit 144 and electrically erasable programmable Read Only Memory (EEPROM) 145.

The Real Time Media Independent Interface illustrated in FIG. 1 includes an interface 100 between two programmable real time units (PRUs) 131 and 132 and physical layers EPHY0 118 and EPHY1 128. Physical layers EPHY0 118 and EPHY1 128 are external to interface 100 but may optionally be manufactured on the same integrated circuit as interface 100. Interface 100 includes two transmit channels and two receive channels. The two transmit channels include TX Data/Flags units 111 and 112 connected to respective PRUs 131 and 132; TX PRU2MII units 113 and 114 connected to EPHY0 118 via multiplexer 115 and connected to EPHY1 128 via multiplexer 116. The two receive channels include RX Data/Status units 121 and 122 connected to respective PRUs 131 and 132; RX MII2PRU units 123 and 124 are connected to EPHY0 118 via multiplexer 125 and connected to EPHY1 128 via multiplexer 126. Data can flow from EPHY0 118 to EPHY1 128 via multiplexer 116 and from EPHY1 128 to EPHY0 118 via multiplexer 115. As illustrated schematically in FIG. 1 interface 100 may be configured via configuration (CFG) port on a VBUSP bus or via a two command (CMD) ports 0 and 1 via register 31 (R31) of the corresponding PRU.

PRUs 131 and 132 are preferably each 32-bit Reduced Instruction Set Computers (RISC) operating at 200 MHz to 225 MHz in this example. PRUs 131 and 132 are connected to timer/clock 131 to receive clock signals. Each PRU 131 and 132 is bidirectionally connected to general purpose Input/Output (GPIO) unit 134. Each PRU 131 and 132 can read from and write to shared memory 135 which stores register data, mailbox data and process data. Host CPU 143 can also read from and write to shared memory 135.

MII_RT interface 100 provides a programmable I/O interface for PRUs 131 and 132 to access and control the two MII ports. In this invention PRU registers R30 and R31 are used to receive, transmit and control the data ingress/egress process. The R31 register input to PRU is used to send receive data to PRU; the R30 register is used to send transmit data from PRU and R31 output from PRU is used for controlling the transmit and receive flow.

RX MII Interface

The reception of data over MII is according to IEEE 802.3 protocol.

Frame: <inter-frame><preamble><sfd><data><efd> where: <sfd> is start of frame detect; and <efd> is end of frame detect.

Figure 2:
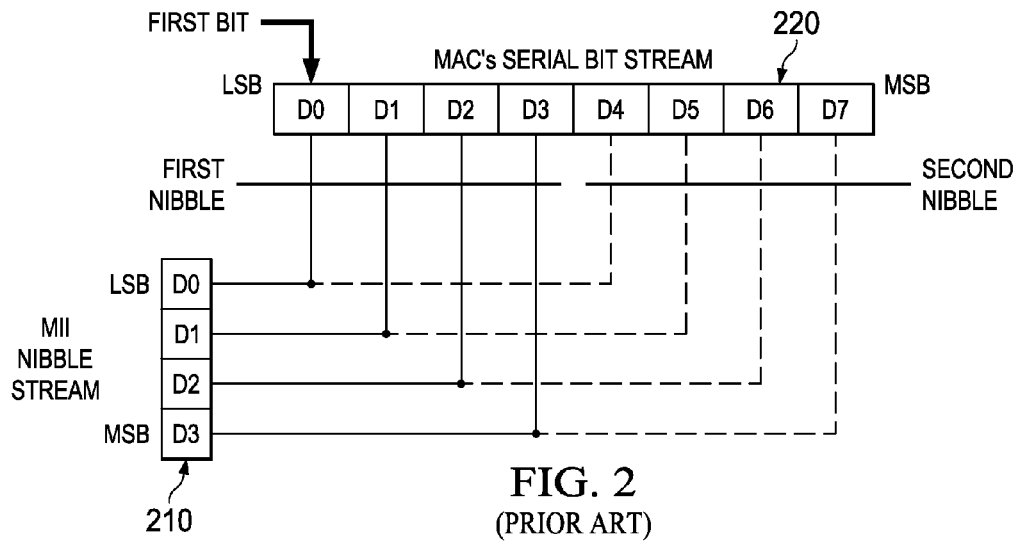
FIG. 2 illustrates the reception of data over Media Independent Interface (MII) in accordance with a prior art standard.

The order in which nibbles are received is illustrated in FIG. 2. The most significant bits (MSB) arriving first is the on the least significant bit (LSB) side of a nibble. Each received nibble is stored in input register 210. Upon receipt the first nibble is stored in bits D0 to D3 of register 220. Upon receipt the second nibble is stored in bits D4 to D7 of register 220. MII_RT receive logic 123/124 waits for both nibbles to arrive before constructing a byte and delivering to the corresponding PRU 131/132 register R31.

RX MII to PRU Interface

There are multiple components in the RX Data/Status units 121 and 122 of interface 100. These components perform various tasks such as latching received data, starting frame detection, CRC calculation/error detection, enhanced link detection and interface to PRU register R31.

Receive Data Latch

Figure 3:
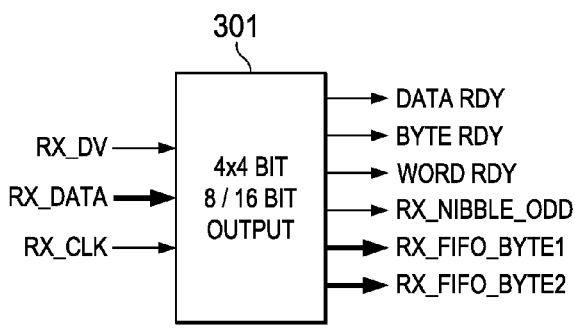
FIG. 3 illustrates the inputs and outputs of a Receiver (RX) data latch of this invention.

FIG. 3 illustrates RX Data Latch 301. The receive data from MII interface is stored in receive data FIFO 301. Data FIFO 301 receives 4-bit data and outputs either 8-bit or 16-bit data. Data FIFO 301 receives the RX data, the RX clock and the control signal RX_DV. Data FIFO 301 generates ready signals DATA_RDY, BYTE_RDY and WORD_RDY. The digital state of RX_NIBBLE_ODD indicates output of an odd or even nibble. Data is output by RX_FIFO_BYTE1 and RX_FIFO_BYTE2 signals. Data FIFO 301 stores up to 32 bytes of receive data. The corresponding PRU 131/132 can access this data through register R31. Depending on the configuration settings, the data can be latched on reception of two or four nibbles. In each scheme, the configured number of nibbles is assembled before being copied into the PRU registers. Additional details are in the following sub-sections.

The receiver logic in MII_RT can be programmed to remove or retain the preamble from incoming frames.

Start of Frame Detection

Figure 4:
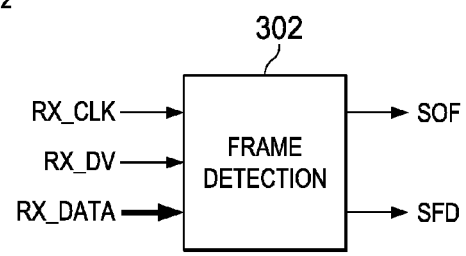
FIG. 4 illustrates the inputs and outputs of a frame detector of this invention.

FIG. 4 illustrates frame detector 302. Frame detector 302 receives the RX data, the RX clock and the control signal RX_DV. Frame detector 302 generates start of a frame (SOF) signal indicating the start of a frame and start of frame delimiter (SFD). Frame detector 302 tracks the frame boundaries and signals the beginning of a frame to other components of the ICSS. This module detects two events. The first event is the start of frame event (SOF) that occurs when Receive Data Valid MII signal is sampled high. The second event is when a valid Start of Frame Delimiter (SFD) is seen on MII Receive Data bus. These event triggers can be used to add timestamp to the frames. The notification for these events is available via the R31 as well as via an Interrupt Controller (INTC) that is integrated in the ICSS.

CRC Error Detection

Figure 5:
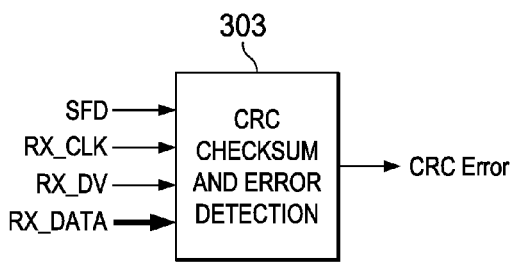
FIG. 5 illustrates the inputs and output of a Cyclic Redundancy Check (CRC) and error detection unit of this invention.

FIG. 5 illustrates the input and outputs for Cyclic Redundancy Check (CRC) checksum and error detection unit 303. Cyclic Redundancy Check (CRC) checksum and error detection unit 303 receives the RX data, the RX clock, the control signal RX_DV and the Start of Frame Delimiter (SFD) from frame detector 302. For each frame, cyclic redundancy check (CRC) checksum and error detection unit 303 calculates the CRC and compares it against CRC value included in the frame. When the two values do not match, a CRC error is flagged (output shown in FIG. 5). The CRC error indication is supplied to the register interface and the FIFO interface. It is also provided to the INTC.

RX Error Detection and Action

Figure 6:
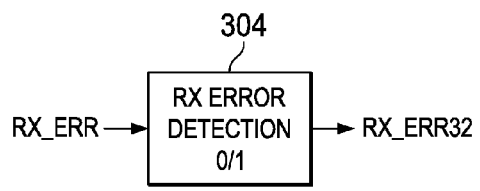
FIG. 6 illustrates the input and output of a Receive (RX) error detector of this invention.

FIG. 6 illustrates the inputs and outputs of RX Error Detection module 304. RX Error Detection module 304 receives the RX_ERR signal and generates the RC_ERR32 signal. RX Error Detection module 304 tracks the receive error signaled by the physical layer and informs the INTC whenever an error is detected. RX Error Detection module 304 tracks a running count of receive error events. The INTC is also notified when 32 or more events have occurred in a 10 μS window. The 10 μS window used to determine the frequency of occurrence of RX Error events is not a sliding window but a non-overlapping window with no specific initialization time with respect to incoming traffic. The timer starts its 10 μS counts immediately after de-assertion of reset to the MII_RT module.

The RX_ERR signal is sampled only when RX_DV is asserted. All nibbles are discarded following a RX_ERR event including the nibble which had RX_ERR asserted. This state remains until an End of Frame (EOF) occurs. Because of this RX_FIFO and RXL2 FIFO never receive any data with RX_ERR asserted or post RX_ERR assertion during that frame.

RX MII to PRU Interface via Register R31

The data received from MII interface 100 is fed into the R31 of the corresponding PRU 131/132 so that the firmware can directly operate on this data without having to read it in a separate instruction. This is illustrated in FIG. 6.

When the new data is received, the PRU 131/132 is supplied two bytes at a time in the R31 register. Once the PRU 131/132 reads the incoming data, it instructs the MII_RT 100 through R31 control bits to pop one or two bytes of data. The pop operation causes current contents of R31 to be refreshed with new data from the incoming packet. Each time the data is popped, the status bits change to indicate the new status. If the pop is completed and there is no new data, the status bits immediately change to indicate no new data.

The receive nibble and byte order is as follows. For the default state of RXCFG0/1.RX_BYTE_SWAP=0, the order is:

R31[15:8]/RXL2[15:8]=Byte1{Nibble3,Nibble2} and
R31[7:0]/RXL2[7:0]=Byte0{Nibble1,Nibble0}.

For the opposite state of RXCFG0/1.RX_BYTE_SWAP=1, the order is:

R31[15:8]/RXL2[15:8]=Byte0{Nibble1,Nibble0} and
R31[7:0]/RXL2[7:0]=Byte1{Nibble3,Nibble2}.

Nibble0 is the first nibble received.

Table 1 below notes the field name and description for various fields of R31.

TABLE 1

| Bits R31 | Field Name | Description |
|---|---|---|
| 31:30 | RESERVED | In case of register interface, these bits are provided to PRU by other modules in ICSS. From the MII_RT module point of view, these bits are always zero. |
| 29 | RX_MIN_FRM_CNT_ERR | When set RX_MIN_FRM_CNT_ERR set event Cleared by RX_ERROR_CLR |
| 28 | RX_MAX_FRM_CNT_ERR | When set RX_MAX_FRM_CNT_ERR set event Cleared by RX_ERROR_CLR |
| 27 | RX_EOF_ERROR | When set RX_EOF set event or RX_ERROR set event Cleared by RX_EOF_CLR and/or RX_ERROR_CLR |
| 26 | RX_MAX_PRE_CNT_ERR | When set RX_MAX_PRE_CNT_ERR set event occurred Cleared by RX_ERROR_CLR |
| 25 | RX_ERR | When set, this bit indicates that MII_RXERR asserted when MII_RXDV Cleared by RX_ERROR_CLR |
| 24 | ERROR_CRC | When set, this bit indicates that the frame has CRC mismatch. This bit is valid when the RX_EOF bit is set. It is cleared by RX_EOF_CLR Early status, it is calculated before RXL1 FIFO |
| 23 | ERROR_NIBBLE | When set, this bit indicates that the frame ended in odd nibble. This bit should be considered valid only when the RX_EOF bit is set. Nibble counter is enabled post SFD It is cleared by RX_EOF_CLR Early status, it is calculated before RXL1 FIFO Determine when MII_RXDV is de-asserted |
| 22 | RX_SOF | Receive start of frame indicator. This bit transitions from low to high when the frame data starts to arrive. The PRU must write one to this bit via the command interface to clear it. The recommended time to clear this bit is at the end of frame. Early status, it is calculated before RXL1 FIFO Asserted when MII_RXDV is sampled asserted |
| 21 | RX_SFD | Receive SFD Detected indicator. This bit transitions from low to high when the SFD sequence is observed on the receive MII data. The PRU must write one to this bit via the command interface to clear it. The recommended time to clear this bit is at the end of frame. Early status, it is calculated before RXL1 FIFO Asserted on the first 5D pattern post RX_SOF |
| 20 | RX_EOF | Indicates that the frame has ended. It also validates the CRC match bit. The PRU must write one to clear this bit in the command interface at the end of the frame. It is calculated before RXL1 FIFO Asserted when MII_RXDV is sampled de-asserted |
| 19 | RX_ERROR | Indicates that the frame had a one or more RX_MAX/MIN_FRM_CNT_ERR RX_MAX/MIN_PRE_CNT_ERR RX_ERR Cleared by RX_ERROR_CLR |
| 18 | WORD_RDY | All four nibbles in R31 have valid data. RX_POP16 to WORD_RDY update has 2 clock cycle latency. FW needs to insure it does not read WORD_RDY/BYTE_RDY until 2 clock cycles after RX_POP16 |
| 17 | BYTE_RDY | Lower two nibbles in R31 have valid data. RX_POP8 to BYTE_RDY update has 2 clock cycle latency. FW needs to insure it does not read BYTE_RDY/WORD_RDY until 2 clock cycles after RX_POP8 |
| 16 | DATA_RDY | When set, it indicates that there is valid data in R31 ready to be read. This bit goes to zero when the PRU does a POP8/16 (see later sections) and if there is no new data left in the receive MII port. This bit says high if there is more receive data for PRU to read. RX_POP16/8 to WORD_RDY/BYTE_RDY update has 2 clock cycle latency. FW needs to insure it does not read BYTE_RDY/WORD_RDY until 2 clock cycles after RX_POP8/RX_POP16 |
| 15:8 | BYTE1 | Data Byte 1. This data is available such that it is safe to read by the PRU when the DATA/BYTE/WORD ready bits are asserted. |
| 7:0 | BYTE0 | Data Byte 0. This data is available such that it is safe to read by the PRU when the DATA/BYTE/WORD ready bits are asserted. |

If the data from receive path is not read in time, the data is still continuously provided to receive data FIFO 301 but it gets automatically discarded because of lack of space in the FIFO. When data is discarded due to FIFO overflow, an interrupt is issued to host CPU 143 via the INTC. A RX RESET is required to clear from this condition.

The receive data in the R31 PRU register is available following synchronization to the PRU clock domain. There is a delay when data is available from MII interface 100 and it is accessible to the PRU 131/132.

Receive data FIFO 301 may be reset through software. When reset, all contents are purged. This may result in the current frame not being received as expected. Any new frame arriving on the receive MII port will be stored in receive data FIFO 301.

The RX MII to PRU Interface 123/124 via RX L2 has the following features illustrated in FIG. 8. PRU0 131 is connected to memory 321 including two banks, bank0 and bank 1, via bitstream transfer (BS/XFR) port. Receive port 322 supplies data to both memory 321 and to register 31 of PRU0 131. Similarly, PRU1 132 is connected to memory 331 including two banks, bank0 and bank1, via BS/XFR port. Receive port 332 supplies data to both memory 331 and to register 31 of PRU1 132. Multiplexer 125 (not illustrated, see FIG. 1) permits PRU0 131 to receive or transmit via EPHY0 118 or EPHY1 128. Similarly Multiplexer 126 (not illustrated, see FIG. 1) permits PRU1 132 to receive or transmit via EPHY0 118 or EPHY1 128.

The structure of FIG. 8 permits relaxed real time servicing for EtherCat Slave Controller (ESC) Reverse path processing or RX without ESC. There is an 8-bit status for every 16-bit data. The data is packed in a data array. The status is packed in a status array. Each RX MII to PRU Interface 123/124 includes 64B data buffer high performance read using XFR.

This interface is dual use and when disabled used as Scratch PAD. The interface supports "short" frames of less than 64 bytes. There are status Identifies EOFs and number of valid bytes. There is one interface per PRU. There are 2 Banks of 32 Byte of data supporting a simple ping/pong write method. There are 2 modes of operation, ESC Reverse and Ethernet RX. The ESC reverse mode includes cut through a receive level one FIFO (RX.L1) to a transmit level one FIFO (TX.L1) and PRU snoop (RX.L1 to PRU). The ECS reverse mode is an autonomous mode that enables transmit/receive data transfer without the PRU handling byte/word transfers. The Ethernet RX mode includes transfer from a level one FIFO (RX.L1) to a level two FIFO (RX.L2) to a PRU with no L2 backpressure to L1.

Table 2 shows the use of PRU transmit registers.

TABLE 2

| Register | XFR ID | Domain/Function | Description | More Notes |
|---|---|---|---|---|
| R2:R9 Data R10:R13 Status | 20 | Bank0 | Every 16-bit data has 1 8-bit status | RX L1 will push into RX L2 See Table 1 for Status format |
| R2:R9 Data R10:R13 Status | 21 | Bank1 | Every 16-bit data has 1 8-bit status | RX L1 will push into RX L2 See Table 1 for Status format Fwd Status byte gets cleared at the same time current Status byte gets updated. |
| R18 [5:0] | 20/21 | Current byte write pointer | 0 = Bank0.R2 63 = Bank1.R9 | Reset to 0 |

RX L2 is an optional high performance buffer which uses the PRU XFR interface. This buffer has 3 modes listed in Table 3.

TABLE 3

| Mode | Configuration | Notes |
|---|---|---|
| Scratch Pad | RXCFG0/1.RX_L2_ENABLE = 0 | RX L2 Bank0 and RX L2 Bank1 operate like simple read/write memory mapped registers R2:R13 All XFR size/start operations supported. RX_ RESET has no effect |
| PRU snoop mode | RXCFG0/1.RX_L2_ENABLE = 1 TXCFG0/1. TX _AUTO _SEQUENCE = 1 | Cut through (RX.L1 to L1.TX) and PRU snoop (RX.L1 to PRU) RX_RESET clears all Data and Status elements |
| Normal MII RX L2 mode | RXCFG0/1.RX_ L2 _ENABLE = 1 TXCFG0/1. TX _AUTO_SEQUENCE = 0 | RX.L1 to RX.L2 to PRU, NO L2 backpressure to L1 RX _RESET clears all Data and Status elements |

In the PRU snoop mode, when the RX.L1 is pushing data into the TX.L1 it is at the same time pushing data into RX.L2. The RX.L1 will push into TX.L1 as long as it is enabled and not full.

In the Normal MII RX L2 mode, the RX.L1 is pushing data into RX.L2 from when the first byte is ready up to the final EOF marker push. This mode has no backpressure. The RX.L1 will remain near empty with only one byte stored.

Both the PRU snoop mode and the Normal MII RX L2 mode have the following behavior:

R18[5:0] contains simple current write pointer;
R18[5:0]=0 Bank0.R2 is being updated at Byte0;
R18[5:0]=1 Bank0.R2 is being updated at Byte1;
R18[5:0]=2 Bank0.R2 is being updated at Byte3;
. . .
R18[5:0]=63 Bank1.R9 is being updated at Byte3.

Software can read R18 to determine which Bank has active write transactions and the location of the transactions. With this information the software can read multiple times the stable preserved data. XFR RD transactions have no effect on any status or other states in RX L2. It is passive.

R10:R13 Status

The next Status byte clears at the same time current Status byte updates, the rest of the Status buffer is persistent. If Auto forward of the preamble is enabled, the first Status byte of the frame will get packed until the Data Byte3 starts. STATUS_ RDY is set when RX_EOF or write pointer advances by 2. This is a simple method for software to determine if RX_EOF event has occurred or new data is available.

RXL2 write pointer will always advance for a minimum of 2 for all SOF events. This will prevent status byte overlaps caused by frames which do not have a SFD, frames which have less than 2 bytes or frames which get aborted by an early RX_ERR. These types of frames will always have RX_ERROR asserted.

Table 4 shows the RXL2 status bit definitions.

TABLE 4

| Bit | Field Name | Description |
|---|---|---|
| 7 | ERROR_CRC | When set, this bit indicates that the frame has CRC mismatch. This bit is valid when the RX_EOF bit is set. Early status, it is calculated before RXL1 FIFO It will only be set for one entry, self clear on next entry |
| 6 | ERROR_NIBBLE | When set, this bit indicates that the frame ended in odd nibble. This bit should be considered valid only when the RX_EOF bit is set. Nibble counter is enabled post SFD Early status, it is calculated before RXL1 FIFO Determine when MII_RXDV is de-asserted It will only be set for one entry, self clear on next entry |
| 5 | RX_SOF | Receive start of frame indicator. This bit transitions from low to high when the frame data starts to arrive. The PRU must write one to this bit via the command interface to clear it. The recommended time to clear this bit is at the end of frame. Early status, it is calculated before RXL1 FIFO Asserted when MII_RXDV is sampled asserted It will only be set for one entry, self clear on next entry |
| 4 | RX_SFD | Receive SFD Detected indicator. This bit transitions from low to high when the SFD sequence is observed on the receive MII data. The PRU must write one to this bit via the command interface to clear it. The |

TABLE 4-continued

| Bit | Field Name | Description |
|---|---|---|
| | | recommended time to clear this bit is at the end of frame. Early status, it is calculated before RXL1 FIFO Asserted on the first 5D pattern post RX_SOF It will only be set for one entry, self clear on next entry |
| 3 | RX_EOF | Indicates that the frame has ended. It also validates the CRC match bit. The PRU must write one to clear this bit in the command interface at the end of the frame. It is calculated before RXL1 FIFO Asserted when MII_RXDV is sampled de-asserted It will only be set for one entry, self clear on next entry |
| 2 | RX_ERROR | Indicates that the frame had a one or more RX_MAX/MIN_FRM_CNT_ERR RX_MAX/MIN_PRE_CNT_ERR It will get set for first ERROR, self clear on SOF for the next FRAME. |
| 1 | STATUS_RDY | STATUS_RDY is set when RX_EOF or write pointer advanced by 2. This is a simple method for Software to determine if RX_EOF event has occurred or new data is available If RX_EOF is not set, all status bits are static and final. |
| 0 | RX_ERR | When set, this bit indicates that MII_RXERR asserted when MII_RXDV occurred during SOF to EOF It will get set for first MII_RXERR event, self clear on SOF for the next FRAME. |

RXL2 Programming Model

RXL2 is a simple ping pong buffer; each bank has 32 Bytes of data. Data and status are persistent except the next new status byte is cleared. A write pointer points to the next new byte. Software can determine which bytes are valid by reading the write pointer. There is one status byte per 16 bits of data, similar to R31 direct mode. Software can poll STATUS_RDY to determine if EOF occurred or status is static and new data is available. Status mapping n is even value.

If SOF, SFD, EOF, CRC (optional) and ERROR (optional) are asserted then data[n] is associated with EOF, CRC and maybe ERROR and data[n+1] is associated with SOF, SFD and maybe ERROR. Software needs to read RX_ERR memory mapped register to determine source, hence mapping.

If SOF, SFD and STATUS_RDY are asserted then data[n] is associated with SOF and SFD.

If EOF, CRC (optional), ERROR (optional) and STATUS_RDY are asserted, if write pointer=n+1, then data[n] is associated with EOF, CRC (optional) and ERROR (optional). If write pointer=n+2, then data[n+1] is associated with EOF, CRC (optional) and ERROR (optional).

Boundary Cases wrt_ptr=n+3, data[n] is valid, data[n+1] is valid, status[m] is valid and static, status[m+1] is active, status[m] is the combined status of {data[n+1], data[n]}.

wrt_ptr=n+2, data[n] is valid and static, data[n+1] is valid and static, status[m] is valid and static only for data[n], for data[n+1] only RX_SOF and RX_SFD are valid and static, status[m+1] is active.

wrt_ptr=n+1, data[n] is valid and static, data[n+1] is invalid, status[m] is active, all status bits set are valid, but some of the bits might get set at T(n+1)+delta for data[n] and/or data[n+1], status[m+1] is cleared.

Early Status will get set before the wrt_ptr increments,

RX_SOF,

RX_SFD,

RX_ERROR for the cases of RX_MAX/MIN_PRE_CNT_ERR and RX_ERR.

Late Status will get set after the wrt_ptr increments,

RX_EOF, in general should get set after 4 bit times after the wrt_ptr incremented, ERROR_CRC, valid when RX_EOF is set, ERROR_NIBBLE, valid when RX_EOF is set.

PRU to TX MII Interface

PRU 131/132 directly drives the corresponding MII transmit interface 113/114 via its R30 register. The contents of R30 and RX Data from receive interface are fed into a transmit FIFO. The transmit FIFO stores up to 64 bytes of transmit data in the exemplary embodiment. As noted above this transmit FIFO could be smaller than or larger than 64 bytes. From the transmit FIFO, the data is sent to the MII TX port of the PHY by the MII_RT transmit logic. Prior to transmission, the mask is applied to the data portion of the R30 register. Using the mask, PRU 131/132 firmware can control whether receive data is sent to transmit, R30 data is sent to transmit or a mix of the two is sent. The Boolean equation that is used by MII_RT to compose TX data is:

TXDATA[7/15:0]=(R30[7/15:0] & MASK[7/15:0]) (RX-DATA[7/15:0] & ~MASK [7/15:0])

From this equation a mask of 0xFF leads to the R30[7:0] being transmitted in an eight bit transmit operation. A mask of 0x0000 leads to receive data being sent out in a 16-bit transmit operation.

FIG. 9 illustrates the transmit interface. The lower 16 bits of the R30 (or FIFO transmit word) contain transmit data nibbles. The upper 16 bits contain mask information. The operation to be performed on the transmit interface is controlled by R31 outputs from PRU to MII_RT. Table 5 shows the nibble and byte order for two configurations.

TABLE 5

| Configuration | Order |
|---|---|
| RXCFG0/1.TX_BYTE_SWAP=0 (default) | R30 [15:8] =Byte1 {Nibble3, Nibble2} R30 [7:0] =Byte0 {Nibble1, Nibble0} R30 [31:24] =TX_MASK [15:8] R30 [23:16] =TX_MASK [7:0] |
| RXCFG0/1.TX_BYTE_SWAP = 1 | R30 [15:8] =Byte0 {Nibble1, Nibble0} R30 [7:0] =Byte1 {Nibble3, Nibble2} R30 [31:24] =TX_MASK [7:0] R30 [23:16] =TX_MASK [15:8] |

Nibble0 is the first nibble transmitted.

Table 6 shows the definition of the bits in the transmit interface register R30 340.

TABLE 6

| Bits | Field Name | Description |
|---|---|---|
| 31:16 | TXMASK | Mask to be applied to TXDATA and RXDATA before it is transmitted. RXDATA cannot be popped before pushing the TXDATA, this will cause new data to propagate before the push. You can pop and push on the same command for bytes only or delay the pop after the push for word or bytes |
| 15:0 | TXDATA | Data provided by the PRU to be sent to transmit path after applying the mask. When 16 bits are to be transmitted, all bits of this and TXMASK field are used. When 8 bits are to be transmitted, the bits [7:0] of this and TXMASK field are used. |

TXDATA includes bytes [15:8] and [7:0]. TXMASK includes bytes [31:24] and [23:16].

The transmit FIFO may be reset through software. When reset, all contents of transmit FIFO are purged and this may result in a frame not getting transmitted as expected. Any new data written in the transmit FIFO results in a new frame being composed and transmitted. An overflow event will require a TX_RESET to recover from this condition.

The rate decoupling FIFO helps interface the output from PRU that is at a clock rate other than TXBCLK. The TXBCLK is used to send nibbles from FIFO to PHY and TX_DATA and TX_DV are generated out of the FIFO. The timing at which data is output from FIFO is controlled to remove processing delays in PRU. The first data from FIFO is sent after a pre-programmed number of PRU clock cycles after first receipt. The typical requirement for this interval is 320 nS which includes the following latency components:

At least 120 ns delay to get DATA into PRU;
Start is relative to the capture of RX using positive edge RX_MII_CLK;
At least 160 nS processing time of PRU per 16 bit; and
At least 40 nS drift compensation for a full Ethernet packet (1500 bytes).

The TX FIFO trigger is configurable to allow increase and decrease in the receive to transmit cut-through interval. On the transmit interface, the Inter-Packet Gap (IPG) specification is complied by tracking the RX_DV to TX_EN delay. This interval is programmable in number of MII_RT clock cycles of delay between RX_DV going high and TX_EN going high. The transmit interface also provides an underflow error signal in case there was no data loaded when TX_EN triggered. The transmit underflow signal is mapped to the INTC in ICSS.

RX MII to TX MII Direct Connection

The Direct Connection allows the frame to pass from the RX to TX without the interaction of the PRU. This mode operation is enabled when TXCFG0/1.TX_AUTO_SEQUENCE is set.

For hardware assisted packet forwarding:
Hardware should enable RX_AUTO_FWD_PRE and RX_L2_ENABLE.
For firmware assisted packet forwarding:
Firmware can enable TX_AUTO_PREAMBLE and RX_CUT_PREAMBLE to insure full preamble is generated for each TX frame.

The PRU can read the pass through frame by polling the standard R31. In Direct mode, the PRU R31 Command is ignored and disabled, except for TX_RESET and RX RESET. The Direct mode State Machine emulates the PRU software R31 Command sequence. All R31 status flags are self cleared. DATA_RDY will only be asserted for one clock cycle, default is 16-bit/WORD mode, expect the last data can be byte or ERROR_NIBBLE.

The following are the legal configurations supported for Direct Connection.
Configuration 1:
  PORT1.RX to PRU1 (snoop only)
  PORT1.RX to PORT0.TX
Configuration 2:
  PORT0.RX to PRU0 (snoop only)
  PORT0.RX to PORT1.TX
Configuration 3:
  PORT1.RX to PORT1.TX
Configuration 4:
  PORT0.RX to PORT0.TX Transmit CRC Computation For the outgoing data, the MII_RT calculates CRC32 value and inserts it into outgoing packets. The CRC value computed on each MII transmit path is also available in memory mapped registers that can be read by the PRU. This is primarily for debug/diagnostic purposes. The CRC is inserted in to the outgoing packet based on the commands received through the R31 register of the PRU.

The CRC programming model supports the following 3 sequences
Sequence 1
  cmd1 TX_CRC_HIGH+TX_CRC_LOW+TX_EOF
Sequence 2
  cmd1 TX_CRC_HIGH
  wait for 6 clocks
  cmd2 TX_CRC_LOW+TX_EOF
Sequence 3
  cmd1 TX_CRC_HIGH
  wait for 6 clocks
  rd TXCRC0/1
  modify CRC[15:0]
  cmd2 TX_PUSH16+TX_EOF+TX_ERROR_NIBBLE Receive CRC Computation For incoming data, the MII_RT calculates CRC32 and then compares against the value provided in the incoming frame. If there is a mismatch, the MII_RT signals it to the PRU. In case previous slave has appended error nibble, the CRC calculation of received packet will be wrong due to longer frame and the frame length will end at 4 bit boundary instead of the usual 8-bit boundary. In case RX_DV goes inactive on a 4-bit boundary, the interface will assert DATA_RDY and BYTE_RDY flag with error nibble. The PRU learns end of frame from RX_EOF bit. The error event is also mapped into INTC.

PRU R31 Command Interface

The PRU uses R31[31:16] to control the reception/transmission of packets in direct/register mode. Table 7 shows the available commands. Each bit in Table 7 is a single clock pulse output from the PRU. When more than one action is to be performed in the same instant, the PRU firmware must set those command bits in one instruction.

TABLE 7

| Bit | Command | Description |
|---|---|---|
| 31 | TX_CRC_ERR | When set, it will add 0xa5 byte to the TX_FIFO if the current frame check sequence is valid. TX_CRC_ERR can only be set with TX_EOF (required) TX_ERROR_NIBBLE (optional) It cannot get set with any other |

TABLE 7-continued

| Bit | Command | Description |
|---|---|---|
| | | command<br>Note for proper operations auto forward preamble must be enabled. |
| 30 | TX_RESET | Reset the transmit FIFO and clear all its contents<br>This is required to recover from a TX FIFO overrun. |
| 29 | TX_EOF | When set, the data loaded is considered last for the current frame |
| 28 | TX_ERROR_NIBBLE | When set, an error nibble is inserted. This makes the frame invalid.<br>It will add 0x0 after the 32-bit CRC |
| 27 | TX_CRC_HIGH | When set, the high 16 bits of calculated CRC are appended to the outgoing frame<br>This command ends the CRC calculations and pushes CRC[31:16] in the TX FIFO.<br>After 6 clocks TXCRC0/1 will become valid. |
| 26 | TX_CRC_LOW | When set, the low 16 bits of calculated CRC are appended to the outgoing frame |
| 25 | TX_PUSH16 | Apply mask to two bytes from receive path and transmit. Note TX_PUSH16 needs to occur before TX_POP16 if data is not fully masked. TX CRC requires the data to be valid for 2 clock cycles. |
| 24 | TX_PUSH8 | Apply mask to one byte from receive path and transmit |
| 23 | RX_ERROR_CLR | Write one to clear RX_ ERROR indicator bit |
| 22 | RX_SOF_CLR | Write one to clear RX_SOF indicator bit |
| 21 | RX_SFD_CLR | Write one to clear RX_SFD indicator bit |
| 20 | RX_EOF_CLR | Write one to clear RX_EOF status indicator bit |
| 19 | Reserved | Reserved for future use |
| 18 | RX_RESET | Reset the receive FIFO and clear all contents.<br>This is required to recover from a RX FIFO overrun, if software does not want to undrain.<br>The typical use case, is assertion after RX_EOF<br>If asserted during an active frame the following actions will occur<br>1. Terminate the current frame<br>2. The firewall will remain active until RX_dv is de-asserted<br>3. Block/terminate all new data<br>4. Flush/clear all FIFO elements<br>5. Cause RX SM into an idle state<br>6. Cause EOF event<br>7. Cause min frame error, if you abort before min size reached |
| 17 | RX_POP16 | Advance the receive traffic by two bytes<br>This is only required when you are using R31 to read the data.<br>This is an acknowledgement that R31[15:0] has been read do to WORD_RDY. The next new data is allowed to advance.<br>RX_POP16 to WORD_RDY update has 2 clock cycle latency.<br>FW needs to insure it does not read WORD_RDY/BYTE_RDY until 2 clock cycles after RX_POP16 |
| 16 | RX_POP8 | Advance the receive traffic by one byte<br>This is only required when you are using R31 to read the data.<br>This is an acknowledgement that R31[7:0] has been read do to WORD_RDY or BYTE_RDY. The next new data is allowed to advance.<br>RX_POP8 to BYTE_RDY update has 2 clock cycle latency.<br>FW needs to insure it does not read BYTE_RDY/WORD_RDY until 2 clock cycles after RX_POP8 |

Receive Multiplexer

Figure 10:
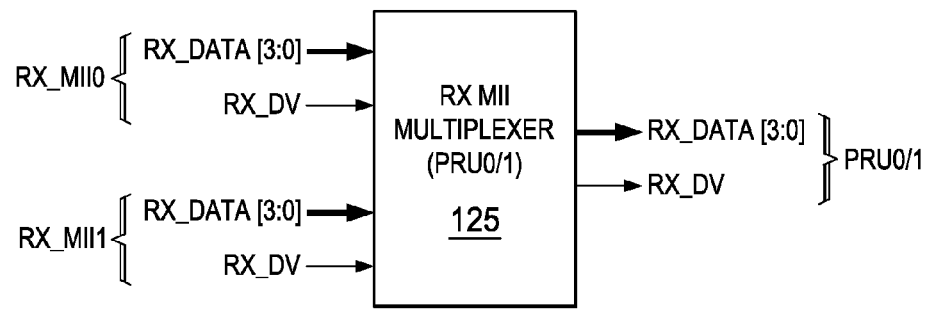
FIG. 10 illustrates the inputs and outputs of a Receive (RX) Media Independent Interface (MII) multiplexer of this invention.

Multiplexers 125 and 125 allow selecting either of the two MII interfaces for the receive data that is sent to the R31 of the corresponding PRU. There is a single multiplexer between the two MII interfaces. FIG. 10 illustrates the input and output connections of an exemplary multiplexer 125. Multiplexer 125 receives data RX_DATA[3:0] and RX_DV from a first external physical layer RX_MII0 (EPHY0 118) and data RX_DATA[3:0] and RX_DV from a second external physical layer RX_MII1 (EPHY1 128). Multiplexer 125 outputs data RX_DATA[3:0] and RX_DV from one of the input physical layers to the corresponding PRU 131/132. There are two receive multiplexers (125/126) to enable selection of RX MII path for each PRU 131/132. The select lines of the RX multiplexers are driven from the ICSS programmable registers.

Transmit Multiplexer

Figure 11:
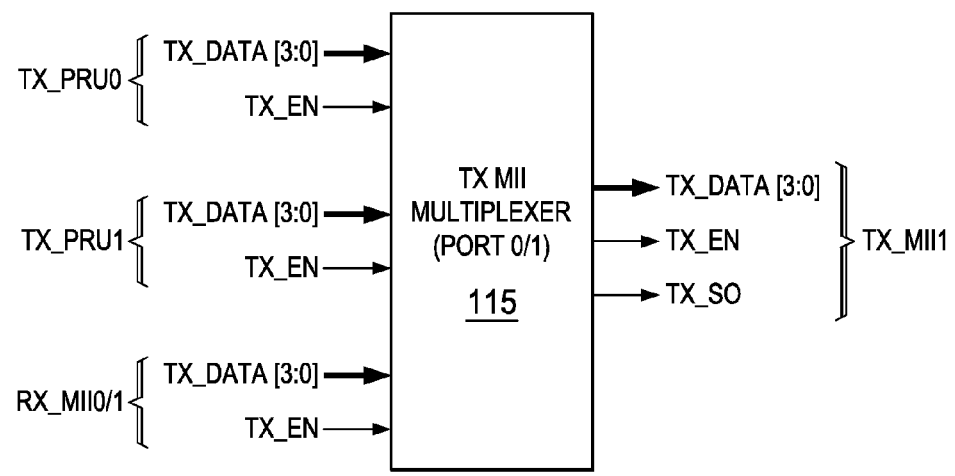
FIG. 11 illustrates the inputs and outputs of a Transmit (TX) Media Independent Interface (MII) multiplexer of this invention.

On the MII transmit ports to EPHY0 118 and EPHY1 128, there is a multiplexer 115/116 that enables selection of either the transmit data from a PRU 131/132 or from the RX MII interface of the other MII interface. FIG. 11 illustrates an exemplary transmit multiplexer 115. Transmit multiplexer 125 receives three sets of signals. These include; data TX_DATA[3:0] and an enable signal TX_EN from PRU0 131; data TX_DATA[3:0] and an enable signal TX_EN from PRU1 132; and data TX_DATA[3:0] and an enable signal TX_EN from RC_MII0/1, in this example is the opposite EPHY1 128. Transmit multiplexer 115 supplies three signals to TX_MII1/0, which in this example is the corresponding EPHY0 118. Transmit multiplexer 116 is similarly constructed. The transmit multiplexers 115/116 enable ICSS to operate in a bypass mode. In this case a PRU 131/132 is not involved in processing data traffic.

There are two instances of the TX MII multiplexer 115/116. Select lines for each TX multiplexer are provided by the ICSS. The select lines are common between register and FIFO interface. It is expected that the select lines will not change during the course of a frame.

Fast Ethernet Timing

Figure 12:
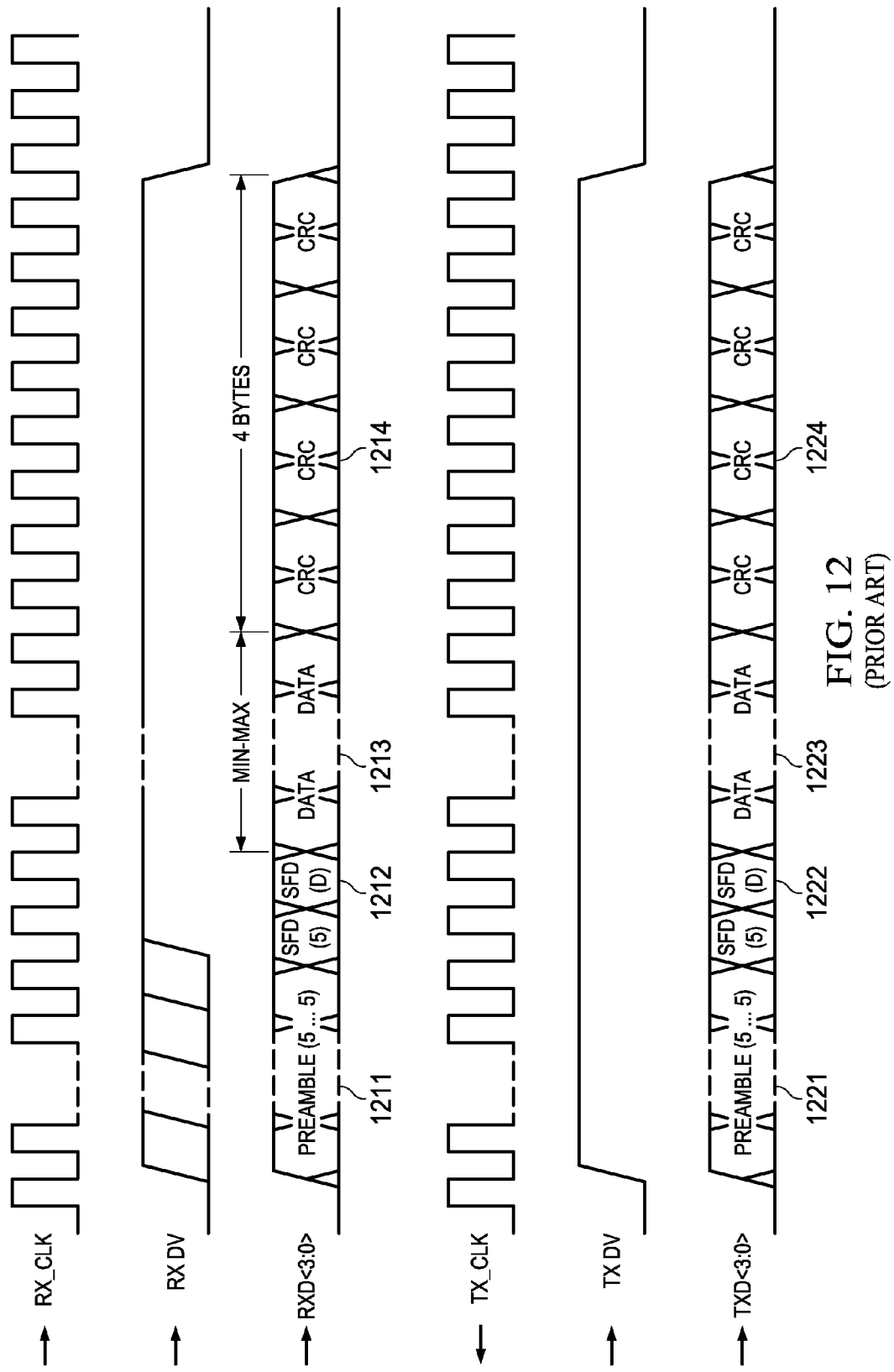
FIG. 12 illustrates an example Ethernet signal timing relationships of this invention in accordance with the prior art standard.

FIG. 12 illustrates the ethernet signal timing relationships in this invention. The receiver clock RX_CLK continuously oscillates. The RX_DV signal is active HIGH when receive data is valid. Data signal RXD<3:0> includes preamble 1211, SDF 1212, a variable amount of data 1213 and 4 bytes of CRC 1214. As illustrated in the left margin all these signals (RX_CLK, RX_DV and RXD<3:0> are received by interface 100. The transmitter clock RX_CLK continuously oscillates. The TX_EN signal is active HIGH when transmit data is valid. Data signal TXD<3:0> includes preamble 1221, SDF 1222, a variable amount of data 1223 and 4 bytes of CRC 1224. As illustrated in the left margin TX_CLK is received by interface 100 and TX_EN and TXD<3:0> are transmitted by interface 100.

Inter-Packet Gap (IPG)

In certain modes of operations the MII_RT does not support a new RX before the current TX has completed. If RX_AUTO_FWD_PRE or TX_AUTO_SEQUENCE is enabled, if a new RX occurs before the current TX completed then new RX can fuse with the current TX. When RX_AUTO_FWD_PRE or TX_AUTO_SEQUENCE is enabled then for normal none error frames IPG min=TX_START_DELAY+90 ns. For short frames, less than 64 Bytes, IPG min=TX_START_DELAY+90 ns+40 ns. For ultra short frames, more than 0 and less than 32 Bits, IPG min=TX_START_DELAY+90 ns+320 ns. For max preamble or pre SFD RX_ERR frames, IPG min=TX_START_DELAY+90 ns+640 ns.

Figure 13:
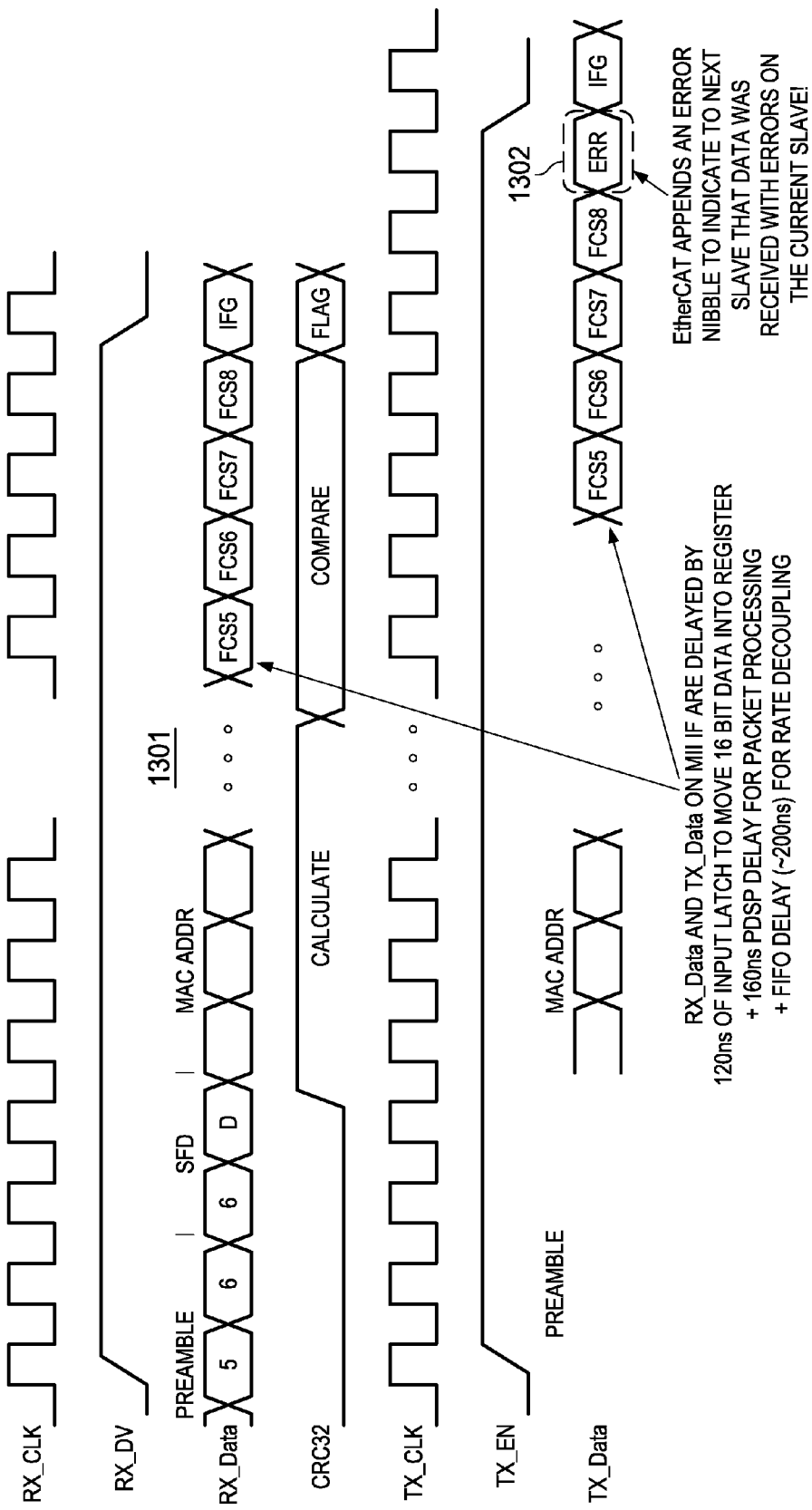
FIG. 13 illustrates an example signal timing relationships of this invention accordance with the prior art standard.

FIG. 13 illustrates an example of receive and transmit timing of this invention in accordance with the Ethernet standard. FIG. 13 illustrates RX_CLK, RX_DV and RX_Data as illustrated in the top half of FIG. 12 and TX_CLK, TX_EN and TX_Data as illustrated in the bottom half of FIG. 12. CRC32 illustrates the timing of the calculation and comparison of the 32-bit CRC. As noted in FIG. 13 the RX Data and the TX_Data are delayed by an amount 1301 including 120 nS of input latch delay to move the 16-bit data into the register, 160 nS of PRU delay for packet processing and about 200 nS FIFO delay. If specified, an error nibble 1302 is inserted into the transmit data to indicate to the next slave that the current slave received data with errors. This invention provides capability to add this error nibble if required to invalidate the packet and mark it as having an error. This is not required by the EtherCAT standard.

The overall timing relationships are still prior art—in accordance with Ethernet standards.

Ethernet PHY Latency

The MII interface operates under strict real-time constraints on data reception and transmission. The latencies are split across various processing elements. The following diagrams illustrate latencies through the PHY.

Transmit

Figure 14:
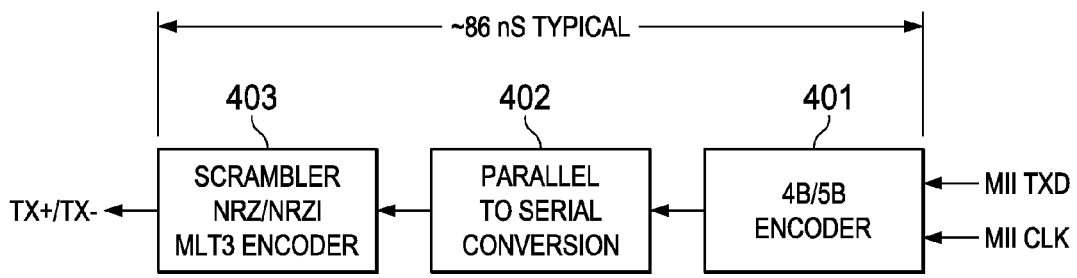
FIG. 14 illustrates the transmit path latency of this invention accordance with the prior art standard.

The transmit port latency of MII_RT is shown in FIG. 14. The transmit path latency include latency in the 4B/5B encode 401, parallel to serial conversion 402 and Scrambler Non-Return to Zero (NRZ)/Non-Return to Zero Inverted (NRZI) multi-level transmit (MLT3) encoder 403. As shown in FIG. 14 this latency from the MII interface to the serial link is typically about 86 nS.

Receive

Figure 15:
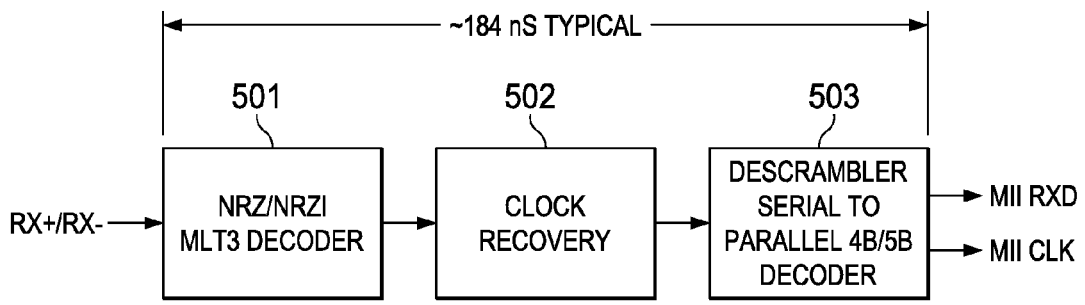
FIG. 15 illustrates the receive path latency of this invention accordance with the prior art standard.

The receive path the latency is shown in FIG. 15. The receive path latency includes latency in Non-Return to Zero (NRZ)/Non-Return to Zero Inverted (NRZI) multi-level transmit (MLT3) decoder 501, clock recover 502 and descrambler serial to parallel 4B/5B decoder 503. The receive path latency is much higher than the transmit path latency. As shown in FIG. 15 this latency is typically about 184 nS.

End to End Latency

The overall latency through the MII interface is a sum of receiver latency, the data transfer latency to PRU, PRU processing latency, latency in data transfer to MII and transmitter latency. The components of this latency are shown in Table 8.

TABLE 8

| Path | Processing Element | Latency (ns) | Cumulative Latency | Notes |
|---|---|---|---|---|
| wire to MII | PHY | 184 | 184 | Phy latency, typical delay |
| MII to ASIC (board) | board | 10 | 194 | Setup time to ASIC |
| ASIC to ICSS | ASIC | 3 | 197 | IO delay and buf |
| MII to PRU | ICSS.MII | 40/120 | | |
| PRU | ICSS.PRU software | 80/160 | | |
| PRU to MII | | 40 | | |
| MII to TX | | 86 ns | | |

Memory Map

Table 9 shows the MII_RT Register summary.

TABLE 9

| Register |
|---|
| RX Config0 (RXCFG0) |
| RX Config1 (RXCFG1) |
| TX Config0 (TXCFG0) |
| TX Config1 (TXCFG1) |
| TX CRC0 (TXCRC0) |
| TX CRC1 (TXCRC1) |
| TX IPG0 (TXIPG0) |
| TX IPG1 (TXIPG1) |
| PORT_RAW_STATUS0 (PRS0) |
| PORT_RAW_STATUS1 (PRS1) |
| RX Frame Size (RXFRMS0) |
| RX Frame Size (RXFRMS1) |
| RX Preamble Count (RXPCNT0) |
| RX Preamble Count (RXPCNT1) |
| RX Error (RXERR0) |
| RX Error (RXERR1) |

RX Configuration 0/1(RXCFG0/1)

Table 10 shows the coding of this register. This register contains the configuration variables for the RX path. RXCFG0 is attached to PRU0. RXCFG1 is attached to PRU1. RXCFG0 controls which RX port is attached to PRU0. RXCFG1 controls which RX port is attached to PRU1.

TABLE 10

| Bits | Field | Type | Reset | Description |
|---|---|---|---|---|
| 31:7 | RESERVED | R | 0x0 | Reserved |
| 6 | RX_AUTO_FWD_PRE | RW | 0x0 | Auto Forward Preamble Mode 0: Disable 1: Enable If Enabled, RX_CUT_PREAMBLE and TX_AUTO_PREAMBLE must be disabled This will forward the preamble nibbles including the SFD to the TX FIFO that is attached to the PRU. First data byte seen by PRU R31 and/or RX L2 is DA Odd number of preamble |

TABLE 10-continued

| Bits | Field | Type | Reset | Description |
|---|---|---|---|---|
| | | | | nibbles is supported in this mode. For example, 0x55D New RX should only occur after the current TX completes |
| 5 | RX_BYTE_SWAP | RW | 0x0 | Controls the order of the Byte0/1 placement for RX R31 and RX L2. 0: Byte1 is the high byte for R31 and RX L2 MSB {Byte1:Byte0} LSB RX R31 15:8 = Byte1 RX R31 7:0 = Byte0 1: Byte1 is the low byte for R31 and RX L2 MSB {Byte0:Byte1} LSB RX R31 15:8 = Byte0 RX R31 7:0 = Byte1 Must be selected /updated when the port is disabled or no traffic It only effects R31 and RX L2 order This cannot get enabled if TX_AUTO_SEQUENCE enabled since TX_BYTE_SWAP on swaps the PRU output. |
| 4 | RX_L2_ENABLE | RW | 0x0 | 0: Disables RX L2 buffer. Can be used as generic scratch pad. 1: Enables RX L2 buffer |
| 3 | RX_MUX_SELECT | RW | 0x0 for cfg0 0x1 for cfg1 | 0: Select MII RX Data from Port 0 1: Select MII RX Data from Port 1 The encoding is identical for both MII Ports and PRUs. Typically, the setting for this will not be identical for the two MII Receive Configuration registers. |
| 2 | RX_CUT_PREAMBLE | RW | 0x0 | 0: All data from Ethernet PHY are passed on to PRU register. This assume Ethernet PHY which does not shorten the preamble 1: MII interface suppresses preamble and sync frame delimiter. First data byte seen by PRU register is DA |
| 1 | RESERVED | R | 0x0 | Reserved |
| 0 | RX_ENABLE | RW | 0x0 | This enables RX traffic which is currently selected by RX_MUX_SELECT |

TX Control Register 0/1 (TXCFG0/1)

This register contains the control information for the transmit path on one of the MII interfaces. TXCFG0 is attached to Port TX0. TXCFG1 is attached to Port TX1. TXCFG0 controls which PRU is selected for TX0. TXCFG1 controls which PRU is selected for TX1. The bit definition for the transmit control registers is shown in Table 11.

TABLE 11

| Bits | Field | Type | Reset | Description |
|---|---|---|---|---|
| 31 | RESERVED | R | 0x0 | Reserved for future use |
| 30:28 | TX_CLK_DELAY | RW | 0x0 | Number of MII_RT clock cycles to wait before launching data on the MII interface. This can be tweaked to meet setup/hold time requirements on the MII TXCLK. The range |

TABLE 11-continued

| Bits | Field | Type | Reset | Description |
|---|---|---|---|---|
| | | | | is one to seven cycles after the MII Transmit edge has been synchronized to MII_RT clock domain. For example TX_CLK_DELAY Delay (nS)<br>0   10-15<br>1   15-20<br><n>   <n>*5+10 to +15<br>6   Reserved<br>7   Reserved |
| 27:26 | RESERVED | R | 0x0 | Reserved for future use |
| 25:16 | TX_START_DELAY | RW | 0x40 | The time interval after which transmit interface starts sending data to MII interface after receiving RXDV for the current frame. This is programmed in number of MII_RT clock cycles. Default should be to have 320 nS of delay which is optimized for min latency at 16 bit processing. Counter is started with RX_DV signal going active. Transmit interface stops sending data when no more data is written into transmit interface by PRU along with TX_EOF marker bit set. Uses the OCP_CLK, default is 200 MHz/5 ns This will not start until the TX FIFO is not empty. This delay only defines the minimum delay. If the TX FIFO has data when the delay expires, then TX will start sending data. If the TX FIFO is empty, it will not start until it is not empty. If TX_AUTO_PREAMBLE is enabled, TX FIFO will not get preamble until the first write occurs. Note the TX FIFO size is 64 Bytes. It is possible to overflow the TX FIFO with the max delay setting when auto forwarding is enabled since the time delay is larger than the amount of data it needs to store. If TX OVERFLOW occurs, then software will need to issue a TX_RESET to reset the TX FIFO. The total delay is 64 Byte times, but you need to allow delays for synchronization. |

TABLE 11-continued

| Bits | Field | Type | Reset | Description |
|---|---|---|---|---|
| | | | | Do to this fact; a MAX delay should be 80 ns less when auto forwarding is enabled. 0x3F0 is the max in this configuration |
| 15:11 | RESERVED | R | 0x0 | Reserved. |
| 10 | TX_AUTO_ESC_ERR | RW | 0x0 | This bit enables the hardware actions required to implement the ESC Error handing table. |
| 9 | TX_AUTO_SEQUENCE | RW | 0x0 | When set to one, it enables automated sequencing of transmit state machine based on events on receiver path that is connected to the respective transmitter. The transmit data source is determined by TX_MUX_SEL setting. When this bit is set, the masking logic that allows for a Boolean combination of PRU or MII data to be transmitted is disabled and only the MII data is used. |
| 8 | TX_MUX_SEL | RW | 0x1 TXCFG0 0x0 TXCFG1 | 0: TX data from PRU0 is selected<br>1: TX data from PRU1 is selected<br>The default/reset setting for TX Port 0 is 1. This setting permits MII TX Port 0 to receive data from PRU1 and the MII RX Port 1 which is connected to PRU1 by default.<br>For MII TX Port 1, the default is zero which allows it to receive data from PRU0 and MII0 that is connected to PRU0 by default. |
| 7:4 | RESERVED | R | 0x0 | Reserved. |
| 3 | TX_BYTE_SWAP | RW | 0x0 | Controls the order of the Byte0/1 placement for TX R30.<br>0: Byte1 is the high byte for R30<br>MSB {Byte1:Byte0} LSB<br>TX R30 15:8 = Byte1<br>TX R30 7:0 = Byte0<br>TX R30 31:24 = TX_MASK[15:8]<br>TX R30 23:16 = TX_MASK[7:0]<br>1: Byte1 is the low byte for R30<br>MSB {Byte0:Byte1} LSB<br>TX R30 15:8 = Byte0<br>TX R30 7:0 = Byte1<br>TX R30 31:24 = TX_MASK[7:0]<br>TX R30 23:16 = TX_MASK[15:8]<br>Must be selected/updated when the port is disabled or no |

TABLE 11-continued

| Bits | Field | Type | Reset | Description |
|---|---|---|---|---|
| 2 | TX_EN_MODE | RW | 0x0 | traffic<br>It only effects R30 pulling order<br>0: disable TX_ENABLE self-clear for a TX_EOF event<br>1: enable TX_ENABLE self-clear for a TX_EOF event |
| 1 | TX_AUTO_PREAMBLE | RW | 0x0 | 0: PRU will provide full pre-amble<br>1: TX FIFO will insert pre-amble automatically<br>The TX FIFO does not get preloaded with the preamble until the first write occurs. This can cause the latency to be larger the min latency. |
| 0 | TX_ENABLE | RW | 0x0 | 0: TX PORT is disabled/stopped immediately<br>1: TX PORT is enabled and the frame will start once the IPG counter expired and TX Start Delay counter has expired<br>When read value is zero, TX is disabled<br>When read value is one, TX is enabled<br>If TX_EN_MODE is set then TX_ENABLE will self clear during a TX_EOF event<br>Software can use this to pre fill the TX FIFO and then start the TX Frame during none ESC operations. |

Transmit CRC32 Register 0/1 (TXCRC0/1)

Table 12 shows the field definitions for the transmit CRC32 registers.

TABLE 12

| Bits | Field | Type | Reset | Description |
|---|---|---|---|---|
| 31:0 | TX_CRC32 | R | 0x0 | Frame Check Sequence (CRC32) data can be read by PRU for diagnostics<br>It is only valid after 6 clocks after a TX_CRC_HIGH command is given. |

TX IPG Register 0/1(TXIPG0/1)

Table 13 shows the field definitions for the transmit IPG registers.

TABLE 13

| Bits | Field | Type | Reset | Description |
|---|---|---|---|---|
| 31:10 | Reserved | R | 0x0 | Reserved |
| 9:0 | TX_IPG | | 0x28 | Define the minimum Inter Packet Gap<br>This defines the minimum of ocp_clk cycles between the de-assertion of TX_EN and the assertion of TX_EN.<br>The start of the TX will get delayed when the incoming packet IPG is less than defined min<br>In general, software should program in increments of 8, 40 ns to insure the extra delays takes effect. |

PORT_RAW_STATUS (PRS0/1)

Table 14 shows the field definitions for the Port_RAW_STATUS.

TABLE 14

| Bits | Field | Type | Reset | Description |
|---|---|---|---|---|
| 31:2 | Reserved | R | 0x0 | Reserved |
| 1 | pr1_mii<port>_crs | R | 0x0 | Read the current state of pr1 mii<port> crs |
| 0 | pr1_mii<port>_col | R | 0x0 | Read the current state of pr1 mii<port> col |

RX Frame Size (RXFRMS0/1)
Table 15 shows the field definitions of the RX frame size registers.

TABLE 15

| Bits | Field | Type | Reset | Description |
|---|---|---|---|---|
| 31:16 | RX_MAX_FRM_CNT | RW | 0x5F1/1521 | If the FRAME total byte count is more than defined value, RX_MAX_FRM_ERR will get set.<br>0 = 1 byte after SFD and including CRC<br>N = N + 1 bytes after SFD and including CRC<br>Note if the incoming frame is truncated at the marker. So, RX CRC and RX ODD NIBBLE will not get asserted |
| 15:0 | RX_MIN_FRM_CNT | RW | 0x3F/63 | If the FRAME total byte count is less than defined value, RX_MIN_FRM_ERR will get set.<br>0 = 1 byte after SFD and including CRC<br>N = N + 1 bytes after SFD and including CRC |

RX Preamble Count (RXPCNT0/1)
Table 16 shows the field definitions of the RX preamble count registers.

TABLE 16

| Bits | Field | Type | Reset | Description |
|---|---|---|---|---|
| 31:4 | RESERVED | R | 0x0 | Reserved |
| 7:4 | RX_MAX_PRE_CNT | RW | 0xe | Define the max number of nibbles until SFD 0xD5 is matched<br>RX_MAX_PRE_COUNT_ERR will set if the preamble count more than<br>0x0 = disabled<br>0x1 = reserved<br>0x2 = forth nibble needs to have built 0xD5<br>0xe = sixteenth nibble needs to have built 0xD5 if not matched then the sixteenth nibble will cause the error to assert and truncate the incoming frame.<br>Note the sixteenth nibble is transmitted |
| 3:0 | RX_MIN_PRE_CNT | RW | 0x01 | Define the min number of nibbles before SFD 0xD5<br>RX_MIN_PRE_COUNT_ERR will set if the preamble count less than<br>0x0 is Disabled<br>0x1 min of 1 0x5 before 0xD5<br>0x2 min of 2 0x5 before 0xD5<br><n> min of <n> 0x5 before 0xD5<br>It does not need to be 0x5 |

RX Error (RXERR0/1)
Table 17 shows the field definitions of the RX Error registers.

TABLE 17

| Bits | Field | Type | Reset | Description |
|---|---|---|---|---|
| 31:4 | RESERVED | R | 0x0 | Reserved |
| 3 | RX_MAX_FRM_CNT_ERR | RW | 0x0 | Set when the FRAME total byte count is more than defined value<br>Write 1 to Clear |
| 2 | RX_MIN_FRM_CNT_ERR | RW | 0x0 | Set when the FRAME total byte count is less than defined value<br>Write 1 to Clear |
| 1 | RX_MAX_PRE_CNT_ERR | RW | 0x0 | Set when of x nibbles before SFD 0xD5 is more than defined value<br>Write 1 to Clear |
| 0 | RX_MIN_PRE_CNT_ERR | RW | 0x0 | Set when of 0x5 before SFD 0xD5 is less than defined value<br>Write 1 to Clear |

Interrupts

The MII_RT tracks multiple events that could lead to generation of interrupt to the INTC in ICSS. These events are classified into receive, transmit and MII link events. Each event can occur on either of the two MII interfaces. The table below lists all interrupts from MII_RT to ICSS INTC module. All events to the INTC are Pulse type. Table 18 shows the interrupt indices, their names and their description.

TABLE 18

| Index | Name | Description |
|---|---|---|
| 0 | PRU0_RX_ERR | Error on receive packet on MII attached to PRU0 |
| 1 | PRU0_RX_ERR32 | Errors over 32 in a 10us window on receive packets attached to PRU0 |
| 2 | PRU0_RX_SFD | Sync frame delimiter detect event attached to PRU0 |
| 3 | PRU0_RX_SOF | Start of frame detect event attached to PRU0 |
| 4 | PRU0_RX_CRC | CRC mismatch error on receive packet attached to PRU0 |
| 5 | PRU0_RX_NIBBLE_ODD | Odd nibble in a received frame attached to PRU0 |
| 6 | PRU0_RX_OVERFLOW | FIFO overflow on receive attached to PRU0 |
| 7 | PORT0_TX_UNDERFLOW | Underflow on transmit FIFO attached to PRU0 TX_RESET is required to recover |
| 8 | PORT0_TX_OVERFLOW | Overflow on transmit FIFO attached to PRU0 |
| 9 | PORT0_MII_LINK | PHY Link Interrupt attached to PORT0 |
| 10 | PRU0_RX_EOF | End of frame detect event attached to PRU0 |
| 11 | (pr1_mii0_col & pr1_mii0_TXen) (external) | Reserved |
| 12 | PRU1_RX_ERR | Error on receive packet attached to PRU1 |
| 13 | PRU1_RX_ERR32 | Errors over 32 in a 10us window on receive packets attached to PRU1 |
| 14 | PRU1_RX_SFD | Sync frame delimiter detect event attached to PRU1 |
| 15 | PRU1_RX_SOF | Start of frame detect event attached to PRU1 |
| 16 | PRU1_RX_CRC | CRC mismatch error on receive packet attached to PRU1 |
| 17 | PRU1_RX_NIBBLE_ODD | Odd nibble in a received frame attached to PRU1 |
| 18 | PRU1_RX_OVERFLOW | FIFO overflow on receive attached to PRU1 |
| 19 | PORT1_TX_UNDERFLOW | Underflow on transmit FIFO attached to PRU1 TX RESET is required to recover |
| 20 | PORT1_TX_OVERFLOW | Overflow on transmit FIFO attached to PRU1 |
| 21 | PORT1_MII_LINK | PHY Link Interrupt attached to PORT1 |
| 22 | PRU1_RX_EOF | End of frame detect event attached to PRU1 |
| 23 | (PR1_MII1_COL & PR1_MII1_TX_EN) (external) | Reserved |

What is claimed is:

1. An interface between a physical layer local area network and a host central processing unit comprising:
   at least one receive channel, each receive channel including
   a receive multiplexer having two inputs, each input connected to a corresponding physical layer and an output,
   a receive interface unit having an input connected to said receive multiplexer output and an output, said receive interface unit converting received data in a first data size into data words of a second larger size, and
   a receive data and status unit having an input connected to said receive interface unit output and an output, said receive data and status unit including a control register and performing data manipulation on input data to generate output data, said data manipulation corresponding to data stored in said control register;
   at least one transmit channel, each transmit channel including
   a transmit data and flags unit having an input and an output, said transmit data and flags unit performing data manipulation upon input data to generate output data,
   a transmit interface unit having an input connected to said transmit data and flags unit output and an output connected to each physical layer, said transmit interface unit converting received data in a third data size into data words of a fourth smaller size; and
   a programmable real-time unit having inputs connected to said output of said receive data and status unit of a corresponding receive channel, outputs connected to said inputs of said transmit data and flags unit of a corresponding transmit channel, said programmable real-time unit bidirectionally coupled to the host central processing unit, said programmable real-time unit operable under program control to perform data processing on received data and supply data to said at least one transmit channel, said programmable real-time unit operable under program control to specify data stored in said control register.

2. The interface of claim 1, wherein:
said at least one receive channel consists of two receive channels.

3. The interface of claim 1, wherein:
said at least one transmit channel consists of two transmit channels.

4. The interface of claim 3, wherein:
each transmit channel further comprises a transmit multiplexer, each transmit multiplexer having two inputs, each input connected to said output of said transmit interface unit of a corresponding channel and an output connected a corresponding physical layer.

5. The interface of claim 4, wherein:
each transmit multiplexer further includes a third input connected to an output of said non-corresponding physical layer.

6. The interface of claim 1, wherein:
said at least one receive channel consists of two receive channels;
said at least one transmit channel consists of two transmit channels; and
said programmable real-time unit consists of two programmable real-time units each connected to a corresponding receive channel and a corresponding transmit channel.

7. The interface of claim 1, further comprising:
a memory connected to said programmable real-time unit and said host central processing unit for storing data and exchanging data between said programmable real-time unit and said host central processing unit.

* * * * *